United States Patent Office 3,406,278
Patented Oct. 15, 1968

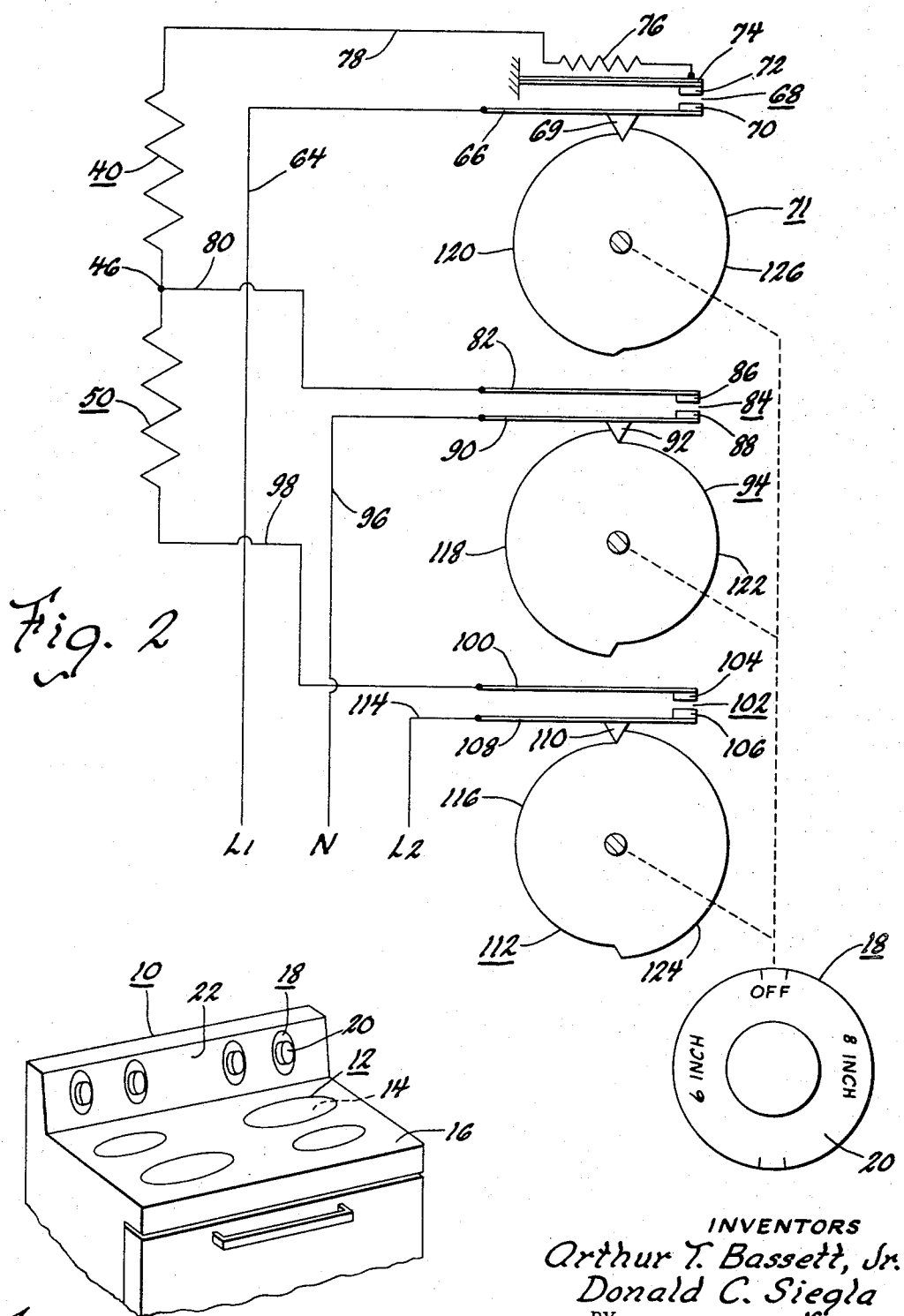

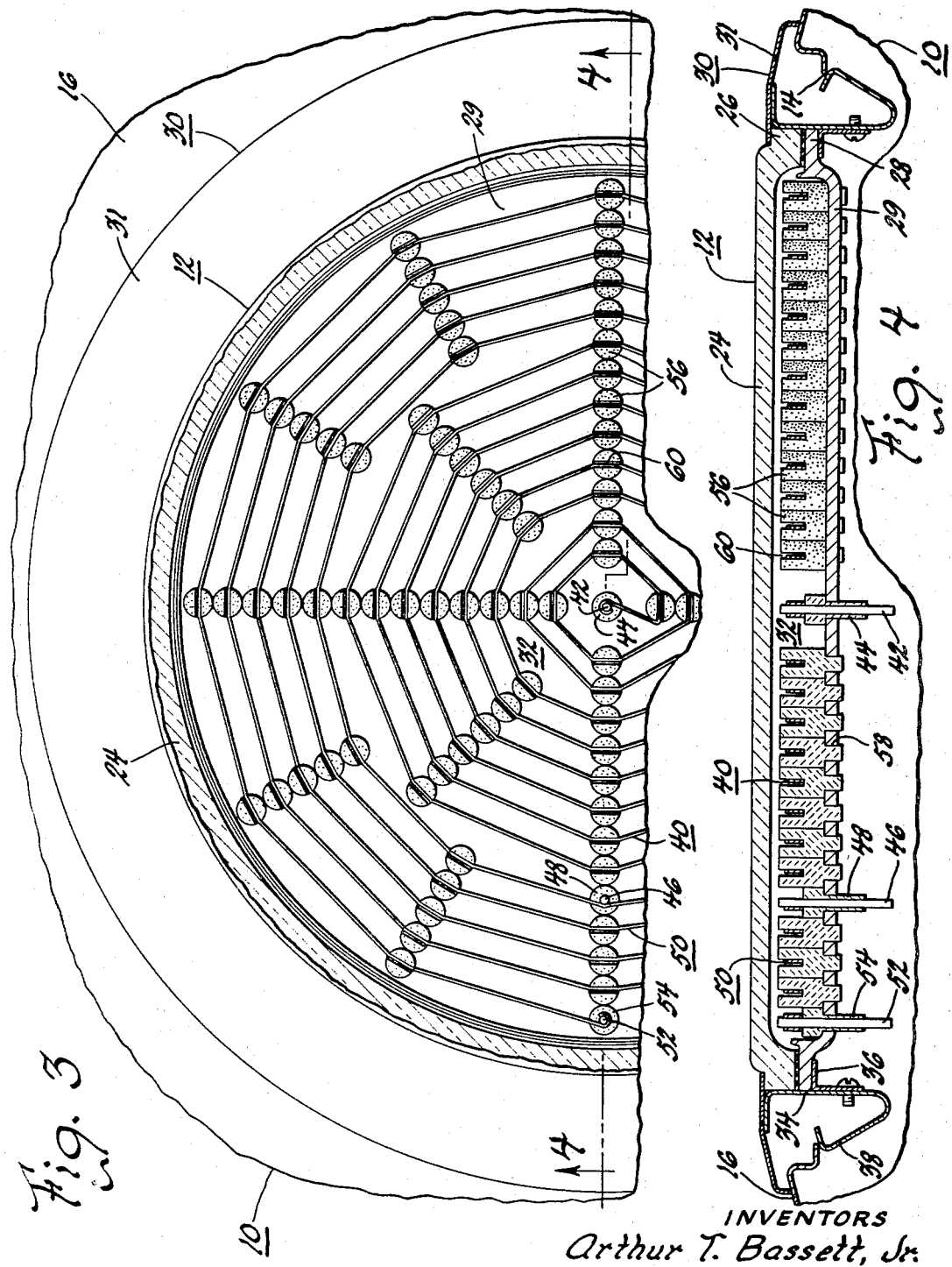

3,406,278
WATTAGE CONTROLLER FOR ELECTRICAL SURFACE HEATING UNIT
Arthur T. Bassett, Jr., and Donald C. Siegla, Dayton, Ohio, assignors to General Motors Corporation, Detroit, Mich., a corporation of Delaware
Filed Oct. 12, 1965, Ser. No. 495,161
3 Claims. (Cl. 219—450)

ABSTRACT OF THE DISCLOSURE

A controller for an electrical surface heating unit including first and second resistance elements of equal ohmic rating. One of the elements defines a six inch diameter heating surface and both of the elements together define an eight inch diameter heating surface. First circuit means energizes one of the resistance elements across a 116-volt supply. Second circuit means energizes both of the resistance elements in series across a 236-volt supply. Switch means selectively connect the resistance elements in either the first or second circuit means. A pulsating bimetallic switch included in both the first and second circuit means varies the wattage output of the resistance elements connected in the respective circuit means.

---

This invention is directed to a surface heating unit and more particularly to an infrared type surface heating unit.

In infrared type surface heating units of the type having a high temperature electrically energizable resistance element that is self-heated into an infrared emissive temperature range, it is desirable to control the energization of the resistance element to produce a wide range of wattage outputs from the unit to carry out various cooking operations such as simmering, boiling, frying and the like.

Accordingly, it is an object of the present invention to improve infrared surface heating units by the provision therein of a plurality of high temperature electrically energizable resistance elements and associated circuit means for selectively controlling the energization of predetermined ones of the resistance elements with a single energy pulsing infinite heat switch means operable at all controlling positions.

A further object of the present invention is to improve infrared type surface heating units by the provision therein of first and second modes of energized electrical resistance elements having a greater and lesser planar extent of direct radiation heating wherein means are provided to energize selectively one of the modes across a predetermined power source through the control of an energy pulsing infinite heat switch and wherein the circuit means includes means for selectively energizing another of the modes across a second greater power source through the same pulsing switch without varying the rate of pulsation of the switch at the control settings thereof.

A further object of the present invention is to improve infrared surface heating units by the provision therein of plural resistance element modes that are selectively energizable to adjust the planar extent of the heated area of the unit to various size cooking vessels whereby infrared radiation from the resistance elements is more effectively matched to the size of a particular cooking vessel on the unit.

Further objects and advantages of the present invention will be apparent from the following description, reference being had to the accompanying drawings wherein a preferred embodiment of the present invention is clearly shown.

In the drawings:
FIGURE 1 is a view in perspective of a domestic range including the infrared surface heating unit of the present invention;
FIGURE 2 is a diagrammatic view of the infrared unit and control circuit therefor of the present invention;
FIGURE 3 is an enlarged, fragmentary view in top elevation of the infrared surface unit, partially broken away; and
FIGURE 4 is a view in vertical section taken along the line 4—4 of FIGURE 3.

Referring now to the drawings, in FIGURE 1 a domestic range 10 is illustrated including a plurality of infrared type surface heating units 12 of the present invention each being located in an opening 14 in a top 16 of the range 10. Each of the units 12, in accordance with certain of the principles of the present invention, is maintained at a predetermined wattage output by an improved controller 18 including a customer control knob 20 representatively shown as being located on a rearwardly located control panel 22 of the range 10.

Referring now to FIGURES 3 and 4, each of the units 12 is illustrated as including a solid upper utensil supporting plate 24 of a suitable infrared transmissive material such as quartz, a recrystallized glass ceramic, such as CerVit, manufactured by Owens-Illinois, or a high silica glass, such as Vycor, manufactured by Corning Glass. The plate 24 has a peripheral flange 26 thereon supportingly received by a peripheral lip 28 on a reflector plate 29 that underlies cover plate 24 in spaced relationship with respect thereto to form a heater containing cavity 32 therebetween. The reflector plate 29 in the illustrated embodiment of the invention is formed of aluminum having a suitable infrared reflective upper surface thereon formed as, for example, by vapor deposited gold on the top surface thereof.

The plates 24, 29 are located within the opening 14 in the top surface 16 of the unit by a trim ring and clamp assembly 30 that includes an annular upper surface portion 31 formed continuously around the upper plate 24 and having an inner peripheral edge thereof overlying the top of the flange 26 and an outer peripheral edge thereof contacting the top 16 radially outwardly of the utensil support plate 24 at a point inclined downwardly therefrom whereby spillage from cooking vessels on the unit is directed onto the range top away from the unit 12. The trim ring and clamp assembly 30 also includes a spring clip member 34 secured to the trim ring 31 and depending therefrom to a point below the reflector plate 29. On the spring clip member 34 is secured a support flange 36 that supportingly receives the lip 28 of the reflector plate 29 for supporting the unit 12 within the opening 14. The spring clip member 34 has an upwardly bent end portion 38 that is biased radially outwardly into spring contact with the top 16 at the opening 14 therein for holding the trim ring and clamp assembly 30 in place with respect to the top 16.

In accordance with other of the principles of the present invention within the heater cavity 32 is located a first high-temperature resistance element 40 having one end thereof electrically connected to a terminal member 42 directed through the reflector plate 29 through an insulating sleeve 44. The element 40 is coiled in a spiral pattern from the terminal 42 to a second terminal 46 directed through an insulating sleeve 48 in the reflector plate 29. The coiled resistance element 40 constitutes a first resistance element mode in the unit that, when electrically connected across a power source, will produce an infrared radiation that is either passed directly through the upper plate 24 or reflected from the plate 29 through the plate 24 to produce a first planar extent of infrared radiant heat that will underlie cooking vessels having a small diameter base. In one working embodiment, the first resistance element mode has an included diameter of six inches.

In addition to the resistance element 40, the unit 12 includes a second resistance element 50 in the cavity 32 located radially outwardly of the resistance element mode 40 and having one end thereof connected electrically to the terminal 46 and being coiled in a spiral fashion through an annular planar extent radially outwardly of the resistance element mode 40 to a point where the opposite end of the resistance element 50 is connected electrically to a terminal 52 directed through an insulating sleeve 54 through the reflector plate 29.

The resistance elements 40 and 50 define a second resistance element mode in one working embodiment having an eight inch diameter.

In the illustrated arrangement, a plurality of ceramic support buttons 56 are supported within openings 58 in the reflector plate 29. Each of the ceramic support buttons 56 has an upper groove 60 directed across the top thereof which supportingly receives a portion of the resistance elements 40, 50 which are representatively illustrated in the disclosed arrangement as having a ribbon shape with a thin cross sectional configuration, as best seen in FIGURE 4. The buttons 56 are interspersed along radially extending lines on the reflector plate 29, as best seen in FIGURE 3, to support the resistance elements 40 and 50 throughout their spiralled length to prevent undesirable sagging of the resistance element as it is energized. The buttons 56, furthermore, serve to locate the resistance elements 40, 50 out of direct conductive heat transfer contact with the plates 24, 29 whereby the energy input to the resistance elements is utilized primarily to raise the temperature of the elements into an infrared emissive temperature range rather than to heat the plate portions of the unit by direct conductive heat transfer. Accordingly, the energy input is utilized more effectively to produce infrared heating of utensils supported on the unit 12.

Furthermore, the ceramic support buttons 56 constitute a plurality of inexpensive support units that are easily adjusted to match a particular configuration of the resistance element other than in that spiral form illustrated. For example, if desired, the resistance elements might be wound as a plurality of loops through a planar extent equivalent to that defined by the spiral configuration illustrated. In this case, the buttons would be arranged to support the reaches of the resistance element to prevent an undesirable expansion and subsequent sagging thereof that might cause the element to contact the reflector plate in an undesirable manner.

Another feature of the present invention is that the resistance elements 40 and 50 are selectively connected across a high and low voltage source to produce a resultant variable wattage output from the unit with the lower wattage output being produced by the first mode of the resistance element and the higher wattage output being produced by the second mode of resistance element. The wattage output is matched to the planar extent of the heated area of the unit to give a wide range of heating effects during energization of one or the other of the resistance elements modes.

More particularly, as shown in FIGURE 2, the improved control system for effecting the variable wattage output is illustrated as including a conductor 64 electrically connected to a wire $L_1$ of a 236-volt, three wire power source. The conductor 64 is connected electrically to an electrically conductive contact carrying arm 66 of an energy pulsing infinite heat switch 68. The arm 66 has a follower 69 thereon engaging a cam element 71 that is rotatable to cause movement of a contact 70 on the arm 66 with respect to a contact 72 on an electrically conductive bimetallic arm 74 of the switch which has one end thereof fixedly connected to a suitable support means with respect to which the contact carrying end of the bimetallic arm 74 is free to deflect. The switch 68 further includes a heater 76 that is connected electrically to arm 74 and by a conductor 78 to one end of the resistance element 40. The opposite end of the resistance element 40 is connected to a conductor 80 at the terminal 46 and the conductor 80 in turn is connected electrically to a conductive arm 82 of a first selector switch 84 including a contact 86 on the end of the arm 82 which is located with respect to a movable contact 88 on an electrically conductive contact carrying arm 90 having a follower 92 thereon that engages a cam member 94 for selectively positioning the movable contact 88 with respect to the contact 86.

The circuit further includes a conductor 96 that is connected electrically to a wire N of the 236-volt, three wire power source. In the circuit the resistance element 50 is connected electrically to the conductor 80 at one end thereof and has its other end connected electrically to a conductor 98 which connects to a conductive contact carrying arm 100 of a second selector switch 102. A contact 104 on the end of the arm 100 is located with respect to a movable contact 106 on an electrically conductive arm 108 of the switch 102 which includes a follower 110 that contacts a cam element 112 to position the contact 106 relative to the contact 104. The contact carrying arm 108 is connected electrically by a conductor 114 to a wire $L_2$ of the 236-volt source.

To obtain a low-wattage operation of the unit wherein only the six-inch diameter mode of resistance element is energized, the customer control knob 20 is positioned in the six-inch region to cause a cam surface 116 on element 112 to open the contacts 104, 106. The cam element 94 at the same time is positioned so that the surface 118 thereon will maintain the contacts 86, 88 closed. The cam 71 of the infinite heat switch 68 will be moved to locate a surface 120 thereon in engagement with the follower 69 to cause a predetermined increasing bias of the contact 70 against the contact 72. The circuit thereby is conditioned for a low-wattage output through the six-inch mode of resistance element defined by the element 40. The circuit is completed across wire $L_1$ through conductor 64 thence through closed contacts 70, 72 of switch 68, heater 76, conductor 78, the resistance element 40, conductor 80, closed contacts 86, 88 of switch 84 and conductor 96 to wire N. The wires $L_1$, N constitute a 118-volt power source which, with a predetermined resistance in the element 40, will produce a variable low-wattage output from the unit 12 through the planar extent of the heated area defined by the six-inch mode of resistance element 40 depending upon the bias of the contact 70 against the contact 72 as determined by the cam surface 120 on cam element 71.

When the controller 18 is moved into the eight-inch mode of operation, the contacts 86, 88 of switch 84 will be opened by movement of the cam element 94 with respect to the follower 92 to align a surface 122 thereon with respect to the follower. At the same time the cam element 112 is positioned to move a surface 124 theron into contact with the follower 110 to close the contacts 104, 106 of switch 102. At the same time a surface 126 on the element 71 is positioned to contact the follower 69 of switch 68 to bias the contacts 70, 72 together in the same fashion as surface 120 on the element 71. The circuit thereby is conditioned to produce a high-wattage output from unit 12 through a larger heated area defined by the second or eight-inch mode of resistance element. The high-wattage output circuit is from wire $L_1$ through conductor 64, the switch 68, conductor 78, the resistance element 40 and resistance element 50, thence through conductor 98, closed contacts 104, 106 of switch 102 and conductor 114 to wire $L_2$. The wires $L_1$, $L_2$ constitute a 236-voltage source. In the illustrated working embodiment, the elements 40, 50 have the same electrical resistance, hence the current draw through the serially connected resistance elements 40, 50 is the same as that current draw through the resistance element 40 when it is connected across the wires $L_1$ and N. The wattage output, however, is increased by the addition of the second resistance element 50 and the increased wattage output is directed through a heated area of greater planar extent as defined by the eight-inch mode resistance element as discussed above. Thus, when a larger utensil is placed on the unit, the greater wattage output of the unit is matched to the utensil to quickly increase the temperature thereof.

Since the current draw is the same for both resistance element modes, the energy pulsing infinite heat switch 68 will operate in a similar fashion during both high and low wattage output whereby one infinite heat switch is used to adjust the power output in both the six-inch and eight-inch modes of resistance element. Thus, the unit, when operating to heat a small area or operating to heat a large area, is controlled through a wide range of power outputs under the control of the infinite heat switch 68.

While the embodiment of the present invention as herein disclosed constitutes a preferred form, it is to be understood that other forms might be adapted.

What is claimed is as follows:

1. In an infrared surface heating unit control system, the combination of, a first resistance element energizable into an infrared emissive temperature range, a second resistance element of substantially equal resistance to said first resistance element energizable into an infrared emissive temperature range, first circuit means including switch means for electrically connecting one of said resistance elements across a first voltage source while de-energizing the other of said resistance elements, second circuit means for serially connecting said first and second resistance elements across a second voltage source substantially twice the voltage of said first voltage source, said first and second circuit means both including a single infinite heat switch pulsatingly varying the power input to said one of said resistance element in said first circuit means for an on-off period corresponding to the pulsing energization of said first and second resistance elements when serially connected in said second circuit means.

2. In the combination of claim 1, said first resistance element extending across a first predetermined planar extent to define a first heated area in the unit, said first and second resistance element being directed across a second greater planar extent to define a second heated area in the unit.

3. In an infrared surface heating unit, the combination of, an upper utensil supporting plate of infrared transmissive material having a predetermined planar extent, a reflector plate located in spaced relationship to said cover plate, a resistance element located between said plates, means for supporting said resistance element out of direct heat transfer contact with said plates, said resistance element underlying substantially the full planar extent of said cover plate, first circuit means for energizing one-half of said resistance element across a first power source, second circuit means for energizing all of said resistance element across a second power source having twice the voltage of the first power source, switch means for selectively connecting said resistance element in either said first or second circuit means, and a single infinite heat switch in said first circuit means for pulsatingly energizing said one-half of said resistance element portion across said first power source to vary the power output therefrom, said infinite heat switch being in said second circuit means to pulsatingly control the energization of all of said resistance element when connected across the second power source for an on-off period corresponding to the pulsating energization of said one-half of said resistance element.

References Cited

UNITED STATES PATENTS

| | | | |
|---|---|---|---|
| 2,790,057 | 4/1957 | Schauer | 219—452 X |
| 2,799,765 | 7/1957 | Jenkins et al. | 219—464 X |
| 2,823,290 | 2/1958 | Warner | 219—450 X |
| 2,824,941 | 2/1958 | Fry | 219—492 X |
| 2,870,316 | 1/1959 | Ferguson. | |
| 3,345,498 | 10/1967 | Siegla | 219—464 |
| 3,348,025 | 10/1967 | Bassett et al. | 219—464 X |

RICHARD M. WOOD, *Primary Examiner.*

L. H. BENDER, *Assistant Examiner.*